Aug. 18, 1936.  J. W. MacCLATCHIE  2,051,262
PISTON
Filed Feb. 19, 1934
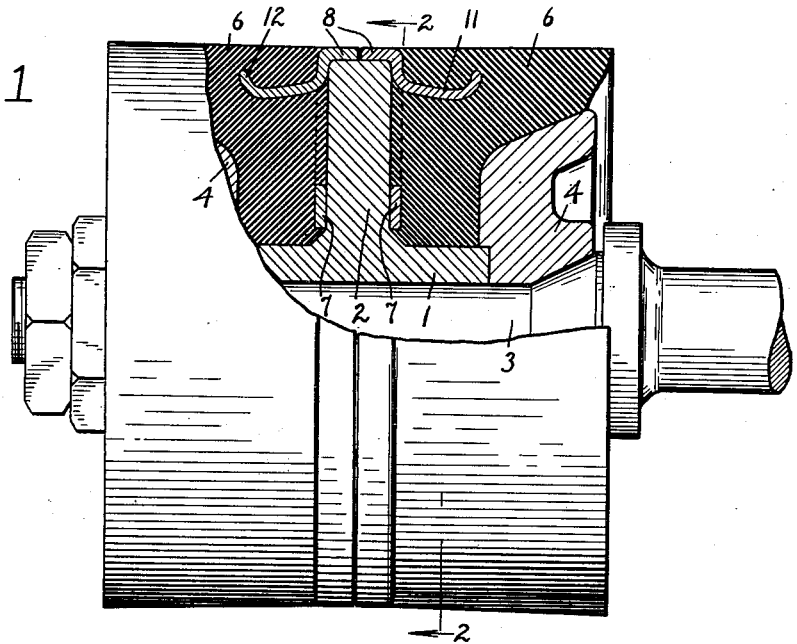
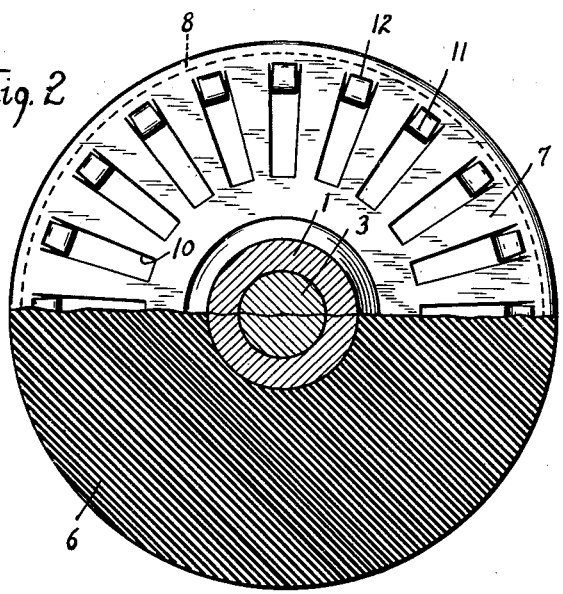 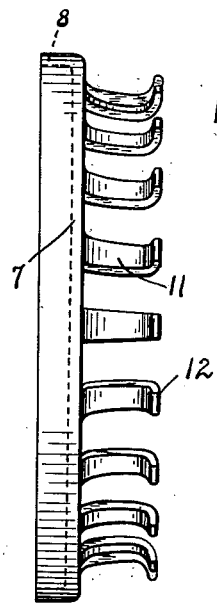
INVENTOR.
JOHN W. Mac CLATCHIE
BY
ATTORNEY.

Patented Aug. 18, 1936

2,051,262

UNITED STATES PATENT OFFICE 2,051,262

PISTON

John W. MacClatchie, Los Angeles, Calif., assignor to MacClatchie Manufacturing Company, Compton, Calif., a corporation of California Application February 19, 1934, Serial No. 711,928

17 Claims. (Cl. 309—23)

This invention relates to packing for pistons such as pump pistons, and more particularly to that type of packing having a reinforcement at one end of a yieldable packing element.

Heretofore it has been proposed to mold a yieldable packing element to an end reinforcement plate, with a pair of these packing elements assembled on a piston hub with their reinforcement plates in confronting relation at opposite sides of a medial flange of the hub, in order for the reinforcements to prevent excessive distortion of the yieldable packing while at the same time having some slight flexibility intended to accommodate normal pressure responsive contraction and expansion of the yieldable packing on the suction and pressure strokes of the pump.

However I have found that a solid reinforcement plate if comparatively thin, so as to flex sufficiently to accommodate normal pressure responsive pulsation of the yieldable packing, is liable to break when the piston is subjected to the relatively high pressure encountered in a pump; while a solid reinforcement plate if thick enough to withstand breakage, will not have the desired flexibility for accommodating pulsations of the yieldable packing and will unduly increase the weight of the piston assembly.

It is an object of the present invention to provide a reinforcement plate for the end of yieldable packing, adapted to withstand breakage and sufficiently rigid to prevent excessive distortion of the yieldable packing, but at the same time having such degree of flexibility as to accommodate itself to pressure responsive pulsation of the yieldable packing. In order to accomplish this result the reinforcement is a plate rather than merely a thin readily flexible sheet, but at the same time is a comparatively thin plate, and has a plurality of openings therein of an area with relation to the thickness of the plate, whereby excessive weight is avoided and such flexibility is acquired as will permit the plate to accommodate itself to normal pressure responsive pulsation of the yieldable packing without liability of breaking, while at the same time maintaining the plate sufficiently rigid to prevent excessive distortion of the yieldable packing.

It is a further object of the invention to provide the reinforcement plate with a projection adapted to be embedded in molded yieldable packing so as to secure the yieldable packing to the reinforcement plate, and to adapt this projection for such flexing as will allow normal pressure responsive pulsation of the yieldable packing. For this purpose a plurality of circumferentially spaced fingers may project from the reinforcement plate and may be embedded in the molded yieldable packing, with the circumferential spacing of the fingers providing for their independent movement and thereby insuring such flexibility as will allow normal pulsation of the yieldable packing on the suction and compression strokes of a pump.

It is a still further object of the invention to provide a simplified construction whereby the desired openings may be formed in the reinforcement plate for insuring the desired flexibility, and at the same time the circumferentially spaced fingers may be formed on the plate, with the molded packing embedding the fingers and molded to the reinforcement plate and extending into the openings for securing the yieldable packing to the reinforcement plate.

Further objects of the invention will be readily understood from the following description of the accompanying drawing, in which:

Fig. 1 is a side elevation of a piston having packing elements constructed in accordance with the invention, and with the packing elements shown partly in axial section.

Fig. 2 is a transverse section on the line 2—2 of Fig. 1, with a part of the yieldable packing broken away.

Fig. 3 is a side elevation of the reinforcement plate for the yieldable packing.

The improved packing elements may be used in a piston assembly for a pump, a pair of the packing elements being mounted on a hub 1 at opposite sides of a medial radially projecting flange 2 which is preferably integral with the hub 1, with the hub 1 mounted on a piston rod 3 and the packing elements clamped against the flange 2 by retaining elements 4 which are removably fixed on the piston rod.

Each packing element comprises an annulus of yieldable material such as rubber, preferably in the form of a cup packing 6, with a reinforcement plate 7 secured to the inner end of the yieldable packing. The packing element 6—7 is thus adapted for replacement as a unit, and a pair of the packing elements may be removably secured on the hub 1 by means of the retaining elements 4, with the reinforcement plates 7 of the pair of packing elements abutting the respective sides of flange 2.

The reinforcement plate 7 overlies substantially the entire area of the end of its yieldable packing 6, preferably extending from the outer periphery of the yieldable packing to approximately its inner periphery; and when a pair of the packing elements are assembled on hub 1, the outer peripheries of their reinforcement plates 7 rather than the outer periphery of the flange 2 are adapted for contact with the cylinder wall of the pump. For this purpose the flange 2 may terminate short of the outer peripheries of the packing elements, and the reinforcement plates 7 have axial flanges 8 at their outer peripheries adapted to overlie the periphery of flange 2 as shown at Fig. 1.

The reinforcement plate 7 is sufficiently rigid to brace the yieldable packing 6 and prevent excessive distortion thereof, while at the same time having some inherent flexibility whereby it may accommodate itself to pressure responsive pulsation of the yieldable packing on the compression and suction strokes of the piston; and the reinforcement plate is of a material adapted to have the rubber packing 6 securely vulcanized thereto, which material is somewhat softer than that of the cylinder wall of the pump so that contact of flanges 8 with the cylinder wall will not score the cylinder. For this purpose the reinforcement plate 7 may be of a material such as brass, copper, zinc alloys, etc., and in practice the reinforcement plate is preferably of brass.

The reinforcement is of such thickness that it is not merely a readily flexible sheet but is a plate which is substantially rigid except when subjected to such pressure as will be encountered in a pump or the like in which the piston is intended to operate; but in order to avoid excessive weight the reinforcement is preferably a plate which is so restricted in thickness that if it were a solid plate it would be liable to break when subjected to the aforementioned pump pressure. The reinforcement plate has a plurality of openings therethrough shown as circumferentially spaced radial slots 10 of an area with relation to the thickness of the plate 7 insuring flexibility and reducing weight so that while the plate is substantially rigid except under appreciable pressure, it is adapted to yield slightly responsive to the relatively high pressure encountered in a pump, thereby avoiding breakage even though the reinforcement, while thicker than a readily flexible sheet and thus constituting a plate, is a comparatively thin plate, and accommodating the plate to normal pressure responsive pulsation of the yieldable packing 6, but with the plate sufficiently rigid to hold the yieldable packing against excessive distortion.

The yieldable packing 6 is preferably vulcanized directly to the reinforcement plate 7 and is molded into the openings 10 so as to securely hold the yieldable packing to the plate, and a projection of the reinforcement plate is preferably embedded in the molded packing for securely holding the parts together. This projection is comparatively rigid with relation to plate 7 but has some slight degree of flexibility so that it may yield and accommodate itself to pressure responsive pulsation of the yieldable packing; and for this purpose the projection may comprise a plurality of circumferentially spaced fingers 11 projecting from plate 7 independently of one another so that they may have some flexibility.

As an instance of this arrangement the openings 10 in the plate 7 are defined by U slits formed in the plate as shown at Fig. 2, and the tongues formed by these U slits are bent outwardly from the plate 7 to form the fingers 11 as shown at Figs. 2 and 3. The ends of the fingers are preferably hooked as shown at 12 so that when the fingers are embedded in the molded packing 6 the plate 7 will be securely fastened to the yieldable packing.

The invention thus provides for reinforcing yieldable packing, with the reinforcement of relatively light weight and holding the yieldable packing against excessive distortion but permitting normal pressure responsive pulsation thereof during its contraction and expansion on the suction and compression strokes of a pump, with the reinforcement adapted for such flexing as will permit it to give rather than break responsive to pump pressure.

I claim:

1. A packing element comprising an annular yieldable packing and a radial reinforcement plate secured to and overlying an end of the annular yieldable packing, the reinforcement plate having tongues bent outwardly therefrom to form fingers projecting from the plate longitudinally of the annular packing and leaving openings through the plate, the fingers being embedded in the yieldable packing.

2. A packing element comprising an annular yieldable packing and a radial reinforcement plate secured to and overlying an end of the annular yieldable packing, the reinforcement plate having tongues bent outwardly therefrom to form fingers projecting from the plate longitudinally of the annular packing and leaving openings through the plate, the fingers being embedded in the yieldable packing, and the yieldable packing extending into the openings.

3. In a piston, a hub, a flange projecting radially from the hub, an annular yieldable packing, and a radial reinforcement plate secured to and overlying an end of the annular packing, the packing being adapted for mounting on the hub with its reinforcement plate against the flange, the reinforcement plate having a projection extending longitudinally of and embedded in the annular yieldable packing, and the reinforcement plate having openings therethrough and being of such material and thickness with relation to the area of said openings that the plate has such flexibility as will accommodate it to pulsations of the yieldable packing resulting from the pressure to which the piston is intended to be subjected, while maintaining such rigidity of the plate as will prevent the yieldable packing being excessively distorted responsive to said pressure.

4. In a piston, a hub, a flange projecting radially from the hub, an annular yieldable packing, and a radial reinforcement plate secured to and overlying an end of the annular packing, the packing being adapted for mounting on the hub with its reinforcement plate against the flange, and the radial reinforcement plate having a plurality of circumferentially spaced fingers projecting therefrom longitudinally of and embedded in the annular yieldable packing, the fingers, throughout their length, being independent of one another circumferentially of the radial reinforcement plate and having such flexibility relative to the radial reinforcement plate as to accommodate the fingers to pulsations of the yieldable packing resulting from the pressure to which the packing element is intended to be subjected.

5. In a piston, a hub, a flange projecting radially from the hub, an annular yieldable packing, and a radial reinforcement plate secured to and overlying an end of the annular packing, the packing being adapted for mounting on the hub with its reinforcement plate against the flange, and the reinforcement plate having tongues bent outwardly therefrom to form fingers projecting from the plate longitudinally of the annular packing and leaving openings through the plate, the fingers being embedded in the yieldable packing.

6. In a piston, a hub, a flange projecting radially from the hub, an annular yieldable packing, and a radial reinforcement plate secured to and overlying an end of the annular packing, the packing being adapted for mounting on the hub with its reinforcement plate against the flange, and the reinforcement plate having tongues bent outwardly therefrom to form fingers projecting from the plate longitudinally of the annular packing and leaving openings through the plate, the fingers being embedded in the yieldable packing, and the yieldable packing extending into the openings.

7. A packing element comprising an annular yieldable packing and a radial reinforcement plate secured to and overlying an end of the annular yieldable packing, the radial reinforcement plate having openings therethrough and being of such material and thickness with relation to the area of said openings that the plate has such flexibility as will accommodate it to pulsations of the yieldable packing resulting from the pressure to which the packing element is intended to be subjected, while maintaining such rigidity of the plate as will prevent the yieldable packing being excessively distorted responsive to said pressure, and the radial reinforcement plate having a flange at its outer periphery projecting longitudinally from said plate at the face of the plate which is remote from the annular yieldable packing.

8. A packing element comprising an annular yieldable packing and a radial reinforcement plate secured to and overlying an end of the annular yieldable packing, the radial reinforcement plate having openings therethrough and being of such inherently substantially rigid material and of such thickness with relation to the area of said openings that the plate has such flexibility as will accommodate it to pulsations of the yieldable packing resulting from the pressure to which the packing element is intended to be subjected, while maintaining such rigidity of the plate as will prevent the yieldable packing being excessively distorted responsive to said pressure, and the radial reinforcement plate having a flange at its outer periphery projecting longitudinally from said plate at the face of the plate which is remote from the annular yieldable packing.

9. A packing element comprising an annular yieldable packing and a radial reinforcement plate secured to and overlying an end of the annular yieldable packing, the radial reinforcement plate being of such material and thickness that responsive to the pressure to which the packing element is intended to be subjected the plate will be liable to break if it were a solid plate; but having openings therethrough of an area whereby said plate has such flexibility as will accommodate it to pulsations of the yieldable packing resulting from said pressure and permit the plate to give rather than break, while maintaining such rigidity of the plate as will prevent the yieldable packing being excessively distorted responsive to said pressure, and the radial reinforcement plate having a flange at its outer periphery projecting longitudinally from said plate at the face of the plate which is remote from the annular yieldable packing.

10. A packing element comprising an annular yieldable packing and a radial reinforcement plate secured to and overlying an end of the annular yieldable packing, the radial reinforcement plate being of such material and thickness that it is inherently substantially rigid but responsive to the pressure to which the packing element is intended to be subjected the plate would be liable to break if it were a solid plate, and the plate having openings therethrough of an area whereby said plate has such flexibility as will accommodate it to pulsations of the yieldable packing resulting from said pressure and permit the plate to give rather than break, while maintaining such rigidity of the plate as will prevent the yieldable packing being excessively distorted responsive to said pressure, and the radial reinforcement plate having a flange at its outer periphery projecting longitudinally from said plate at the face of the plate which is remote from the annular yieldable packing.

11. A packing element comprising an annular yieldable packing and a radial reinforcement plate secured to and overlying an end of the annular yieldable packing, the radial reinforcement plate having openings therethrough with the yieldable packing extending into said openings, and the reinforcement plate being of such material and thickness with relation to the area of said openings that the plate has such flexibility as will accommodate it to pulsations of the yieldable packing resulting from the pressure to which the packing element is intended to be subjected, while maintaining such rigidity of the plate as will prevent the yieldable packing being excessively distorted responsive to said pressure, and the radial reinforcement plate having a flange at its outer periphery projecting longitudinally from said plate at the face of the plate which is remote from the annular yieldable packing.

12. A packing element comprising an annular yieldable packing and a radial reinforcement plate secured to and overlying an end of the annular yieldable packing, the radial reinforcement plate having a projection beyond the plane of said plate and extending longitudinally of and embedded in the annular yieldable packing, and the reinforcement plate having openings therethrough and being of such material and thickness with relation to the area of said openings that the plate has such flexibility as will accommodate it to pulsations of the yieldable packing resulting from the pressure to which the packing element is intended to be subjected, while maintaining such rigidity of the plate as will prevent the yieldable packing being excessively distorted responsive to said pressure.

13. A packing element comprising an annular yieldable packing and a radial reinforcement plate secured to and overlying an end of the annular yieldable packing, the radial reinforcement plate having a plurality of circumferentially spaced fingers projecting therefrom longitudinally of and embedded in the annular yieldable packing, the fingers, throughout their length, being independent of one another circumferentially of the radial reinforcement plate and having such flexibility relative to the radial reinforcement plate as to accommodate the fingers to pulsations of the yieldable packing resulting from the pressure to which the packing element is intended to be subjected.

14. In a piston, a radially projecting flange, an annular yieldable packing, and a radial reinforcement plate secured to and overlying an end of the annular packing and adapted to longitudinally abut the radially projecting flange, the reinforcement plate having a projection extending longitudinally of and embedded in the annular yieldable packing, and the reinforcement plate having openings therethrough and being of such material and thickness with relation to the area of said openings that the plate has such flexibility as will accommodate it to pulsations of the yieldable packing resulting from the pressure to which the piston is intended to be subjected, while maintaining such rigidity of the plate as will prevent the yieldable packing being excessively distorted responsive to said pressure.

15. A packing element comprising an annular yieldable packing and a radial reinforcement plate secured to and overlying an end of the annular yieldable packing, the radial reinforcement plate having a projection extending longitudinally of and embedded in the annular yieldable packing, and the reinforcement plate having openings therethrough and being of such material and thickness with relation to the area of said openings that the plate has such flexibility as will accommodate it to pulsations of the yieldable packing resulting from the pressure to which the packing element is intended to be subjected, while maintaining such rigidity of the plate as will prevent the yieldable packing being excessively distorted responsive to said pressure, and the radial reinforcement plate having a flange at its outer periphery projecting longitudinally from said plate at the face of the plate which is remote from the annular yieldable packing.

16. In a piston, a radially projecting flange, an annular yieldable packing, and a radial reinforcement plate secured to and overlying an end of the annular packing and adapted to longitudinally abut the radially projecting flange, the reinforcement plate having a plurality of circumferentially spaced fingers projecting therefrom longitudinally of and embedded in the annular yieldable packing, the fingers, throughout their length, being independent of one another circumferentially of the radial reinforcement plate and having such flexibility relative to the radial reinforcement plate as to accommodate the fingers to pulsations of the yieldable packing resulting from the pressure to which the packing element is intended to be subjected.

17. A packing element comprising an annular yieldable packing and a radial reinforcement plate secured to and overlying an end of the annular yieldable packing, the radial reinforcement plate having a plurality of circumferentially spaced fingers projecting therefrom longitudinally of and embedded in the annular yieldable packing, the fingers, throughout their length, being independent of one another circumferentially of the radial reinforcement plate and having such flexibility as to accommodate the fingers to pulsations of the yieldable packing resulting from the pressure to which the packing element is intended to be subjected, and the radial reinforcement plate having a flange at its outer periphery projecting longitudinally from said plate at the face of the plate which is remote from the annular yieldable packing.

JOHN W. MacCLATCHIE.